United States Patent Office 3,422,247
Patented Jan. 14, 1969

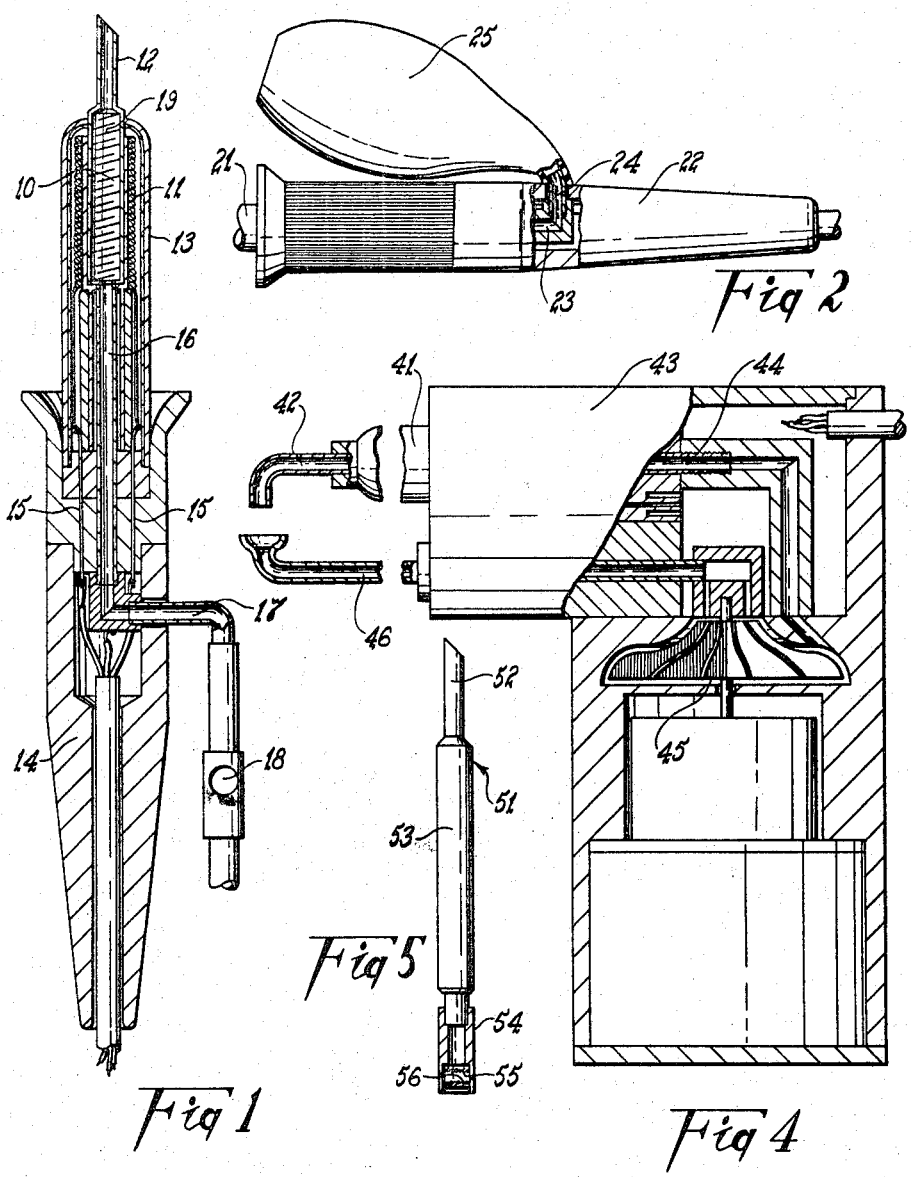

3,422,247
ELECTRICALLY HEATED SOLDERING APPARATUS
Alan L. Royston, 41 Glenburnie Road, Mitcham, Victoria, Australia, and Brian E. Royston, 11 Austin Crescent, Pascoe Vale, Victoria, Australia
Filed Mar. 21, 1966, Ser. No. 536,060
Claims priority, application Australia, Mar. 25, 1965, 56,802/65
U.S. Cl. 219—230      2 Claims
Int. Cl. H05b 3/42

ABSTRACT OF THE DISCLOSURE

A tool includes a heating chamber having a nozzle in communication therewith. An electric heating element is provided to heat nozzle and chamber. The tool may be used for soldering or desoldering. For soldering, a stream of gas under presure is introduced into the chamber, heated therein and the heated gas discharged through the nozzle onto the joint to be soldered. For desoldering, suction is developed in the chamber, whereby the solder melted by the nozzle is sucked up through the nozzle into the chamber. A filter may be provided to prevent solder being drawn into the suction means. The nozzle, chamber and filter may be made as a unit detachable from the tool.

---

Figure 2A:
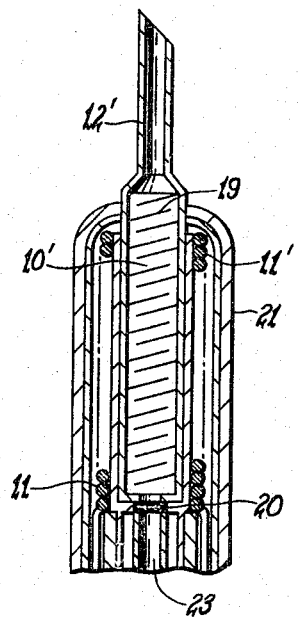

The present invention relates to soldering apparatus such as soldering and desoldering tools and particularly to electrically heated soldering and desoldering tools.

The introduction of electrical and electronic apparatus of extremely small proportions with many miniature sized components has made it difficult to effect the soldering of the connections of the components into the circuit during the manufacture of the apparatus. It has likewise become difficult in the servicing of such apparatus to unsolder the leads of a defective component from the circuit and to replace the defective component with a new component.

Attempts have been made to overcome the above mentioned difficulties by reducing the size of the soldering tips of soldering tools but as the size of the components decreases and their number in a particular space increases the tips cannot be maintained for very long periods in the fine and precise shape required for the accurate soldering of small components. Furthermore there is often insufficient space between components in the apparatus to permit the insertion of a tip between the components to solder the leads of the components into circuit. Even where there is sufficient space between the components to permit a tip to be inserted there is a risk of damage to components and the insulation thereon by heat radiation from the tip and the barrel of the tool. In addition soldered joints are likely to be contaminated by scale and dross transferred from the tip of the soldering tool. The soldering tip is also unable to remove solder from the leads of components in the apparatus.

The present invention has for its primary object to provide a soldering and desoldering tool in which the above difficulties are either obviated or minimized.

According to the invention in one form, a soldering tool comprises a heating chamber, an electrically operated heating element in heat transfer relationship with the heating chamber, means for introducing a stream of gas into the heating chamber under pressure to be heated therein, and a nozzle in communication with the heating chamber for projecting the heated stream of gas onto the joint to be soldered.

According to the invention in another form, a desoldering tool comprises a heating chamber, an electrically operated heating element in heat exchange relationship with the heating chamber, a nozzle in heat transfer relationship with the heating element and in communication with the heating chamber, and means for developing suction in the heating chamber so that when the nozzle is applied to a soldered joint and the solder thereon is melted by the nozzle the melted solder will be sucked through the nozzle into the heating chamber.

In order that the invention may be readily understood reference is made to the accompanying drawings in which:

FIGURE 1 is a longitudinal section of a soldering tool in accordance with the invention, FIGURES 2 and 3 are side elevations, partly in section, showing the tool of FIGURE 1 modified to form a desoldering tool; while FIGURE 2a is an enlarged fragmentary sectional view illustrating part of the tool of FIGURE 2, FIGURE 4 is a modification of the soldering tool of FIGURE 1, and FIGURE 5 is a side elevation, partly in section, of a combined nozzle and heating chamber unit for the desoldering tool of FIGURE 2.

Referring to FIGURE 1 of the drawings the soldering tool illustrated therein includes a heating chamber 10 and an electrically operated heating element 11 in heat transfer relationship with the heating chamber 10. The tool also includes a nozzle 12 in communication with the heating chamber 10.

The heating chamber 10 and the heating element 11 are enclosed in a tubular outer casing 13. The nozzle 12, which may be tubular in form, is located on the outer casing 13 at one end thereof and a handle 14 is attached to the other end of the outer casing 13. Means such as the leads 15 are provided to connect the heating element 11 to a source of current.

The soldering tool also includes means for introducing a stream of gas into the heating chamber 10 under pressure to be heated therein and then to be projected by the nozzle 12 onto the joint to be soldered. These means may comprise a tube 16 extending axially through the outer casing 13 from the heating chamber 10 to an inlet pipe 17 extending from an opening in the handle 14, to which inlet pipe a pump or other pressure developing means may be connected. A control vent 18 which is adapted to be opened and closed to the atmosphere by a valve inserted therein or by the finger of an operator may be provided in the inlet pipe 17 to control the flow of the stream of gas into the heating chamber 10. Alternatively air may be forced through the inlet pipe 17 and the tube 16 into the heating chamber 10 orally by manual exhalation.

Baffles 19 may be provided to effect an efficient transfer of heat from the heating element 11 to the gas.

The gas may be air, hydrogen or other suitable gas.

FIGURES 2 and 2a illustrate a desoldering tool in accordance with the invention. The tool of FIGURES 2 and 2a is similar in construction to that of FIGURE 1 and includes a heating chamber 10', and an electrically operated heating element 11' in heat exchange relationship with the heating chamber 10'. The tool of FIGURES 2 and 2a also includes a nozzle 12' in heat transfer relationship with the heating element 11' and in communication with the heating chamber 10' and means for developing suction in the heating chamber so that when the nozzle is applied to a soldered joint and the solder thereon is melted by the nozzle the melted solder will be sucked through the nozzle into the heating chamber 10'. The heating chamber 10' and the heating element 11' are enclosed in a tubular outer casing 21. The nozzle 12', which may be tubular in form, is located on the outer casing 21 at one end thereof, and a handle 22 is attached to the outer casing 21 at the other end thereof. Leads are provided to connect the heating element to a source of current.

The means for developing suction in the heating chamber may comprise a tube 23 extending axially through the outer casing 21 from the heating chamber to an outlet pipe 24 extending from an opening in the handle 22. A compressible bulb 25 may be connected to the outlet pipe 24.

To prevent melted solder from passing into the axial tube 23 and the bulb 25 a filter unit 20 may be provided between the heating chamber and the axial tube 23.

FIGURE 3 illustrates a modified form of desoldering tool suitable for continuous desoldering operations. The tool of FIGURE 3 is similar in construction to that of FIGURE 1 and FIGURE 2 in that it includes a heating chamber, an electrically operated heating element in heat exchange relationship with the heating chamber, and a nozzle in heat transfer relationship with the heating element and in communication with the heating chamber.

In FIGURE 3, however, the means for developing suction in the heating chamber comprises a tube 31 having one end connected to the heating chamber and extending axially through the outer casing 32 and the handle 33 of the tool. In this embodiment a solder collecting chamber 34 is located in the handle 33 and the other end of the axial tube 31 is connected to the chamber 34. The chamber 34 is adapted to be connected to external suction developing means for which purpose an outlet pipe 35 may be provided. A gauze type filter (not shown) held in position by a circlip (not shown) may be provided between the chamber 34 and the outlet pipe 35 to prevent melted solder being sucked through the outlet pipe 35. A control tube 36 which can be opened and closed to the atmosphere by the finger of the operator may be provided to regulate the suction applied to the tube 31.

FIGURE 4 illustrates a modified embodiment of the soldering tool of FIGURE 1. As in the tool of FIGURE 1 the tool of FIGURE 4 includes an elongated outer casing 41, a nozzle 42 located on the outer casing 41 at one end thereof, a handle 43 attached to the outer casing at the other end thereof, a heating chamber enclosed in the outer casing 41 in communication with the nozzle 42, and an electrically operated heating element mounted in the casing in heat transfer relationship with the heating chamber. In the tool of FIGURE 4 the means for introducing the stream of gas into the heating chamber comprises a first tube 44 having one end connected to the heating chamber and extending axially through the outer casing 41, and an electrically operated impeller 45 connected to the other end of the tube 44 for forcing a stream of gas through the tube 44 into the heating chamber to be heated therein. The tool of FIGURE 4 also includes a second tube 46 extending from a position adjacent to the outer end of the nozzle 42 to the impeller 45 and connected to the impeller 45 so that the impeller 45 will suck heated gas into the tube 46 after it has been projected on the joint to be soldered thereby permitting a large proportion of the gas from the stream of gas to be recovered for recirculation through the tube 44.

FIGURE 5 illustrates a combined nozzle and heating chamber unit 51 for the desoldering tool of FIGURE 2.

The unit 51 includes a nozzle 52, a tubular heating chamber 53 connected at one end to the nozzle and a tubular filter device 54 connected to the other end of the heating chamber 53 to prevent melted solder passing from the unit in use of the tool.

The unit 51 is insertable in the tool of FIGURE 2 in heat exchange relationship with the heating element and removable therefrom to permit the solder retained in the unit to be discharged therefrom.

The filter device 54 may be removably attached to the heating chamber 53 and may include a pair of longitudinally spaced gauze type filters 55 and 56.

In the operation of the soldering tool of FIGURE 1 the nozzle 12 is directed towards the joint to be soldered.

The stream of air or other gas introduced into the heating chamber through the axial tube 16 and the inlet pipe 17 is heated in the heating chamber to a temperature above the melting point of the solder being used and is then projected onto the joint. The solder will be melted to complete the joint. The flow of the stream of gas may be controlled by opening and closing the vent either by the valve therein or by the operator's finger.

In the operation of the desoldering tool of FIGURE 2 the bulb 25 is compressed and the nozzle is placed near to the joint to be unsoldered to melt the solder. When the solder melts the bulb is released and the melted solder is sucked into the heating chamber. After the joint is unsoldered and the solder is sucked into the heating chamber the solder may be discharged therefrom into a suitable container by again compressing the bulb 25.

Alternatively if the unit of FIGURE 5 is inserted in the desoldering tool of FIGURE 2 the unit can be removed from the tool to permit the solder retained in the unit to be removed therefrom.

The desoldering tool of FIGURE 3 operates in a similar manner to the tool of FIGURE 2. However the melted solder from an unsoldered joint is sucked into the solder collecting chamber 34 by the suction developing means connected to the outlet pipe 35. This desoldering tool permits continuous operation in that a number of joints can be unsoldered one after the other.

The soldering tool of FIGURE 4 operates in a similar manner to that of FIGURE 1. The impeller 45 introduces a stream of gas into the heating chamber through the axial tube 44 whence it is projected onto the joint to be soldered by the nozzle 42. However a proportion of the heated gas can be recovered and drawn into the tube 46. The stream will then be re-circulated through the tube 44 and the heating chamber. Particles of solder and flux which might otherwise settle within the apparatus the joints of which are being soldered can also be removed through the tube 46. This is particularly important when the joints of micro-miniature apparatus are being soldered as otherwise the electrical efficiency of the apparatus could be impaired.

Having now described our invention, what we claim as new and desire to secure by Letters Patent is:

1. A desoldering tool comprising an elongated tubular outer casing, a tubular nozzle located on the outer casing at one end thereof, a handle attached to the outer casing at the other end thereof, a heating chamber enclosed in the outer casing in communication with the nozzle, an electrically operated heating element mounted in the outer casing in heat-transfer relationship with the heating chamber and the nozzle, means for connecting the heating element to a source of electric current, conduit means extending lengthwise through the outer casing from the heating chamber to an opening in the handle, means connected to said opening for developing suction and expulsion in the heating chamber so that, when the nozzle is applied to a soldered joint and the solder thereon is melted by the nozzle, the melted solder can be sucked through the nozzle into the heating chamber and when the nozzle is removed from the soldered joint the melted solder can be expelled from the heating chamber through the nozzle, and a filter device located between the heating chamber and said conduit means to prevent melted solder passing into said conduit means so that the solder will be maintained in a molten state in the heating chamber to permit it to be expelled from the heating chamber through the nozzle after it has been sucked into the heating chamber, wherein said nozzle and heating chamber and filter device comprise a unit insertable in the tool in heat-exchange relationship with the heating element and removable therefrom.

2. A desoldering tool as claimed in claim 1, said filter device being detachably connected to the heating chamber and comprising a pair of longitudinally spaced gauze-type filters adjacent to the end of the heating chamber remote from the nozzle.

(References on following page)

References Cited

UNITED STATES PATENTS

| | | |
|---|---|---|
| 1,140,660 | 5/1915 | Brizius. |
| 1,189,735 | 7/1916 | Quimtin. |
| 2,609,778 | 9/1952 | Bleam et al. _____ 228—20 |
| 2,955,187 | 10/1960 | Campo _____ 228—20 |
| 3,172,382 | 3/1965 | Weglin _____ 228—20 |
| 3,211,354 | 10/1965 | Dugard et al. _____ 228—20 |
| 3,245,598 | 4/1966 | Kopernak _____ 228—20 |
| 3,356,830 | 12/1967 | Schleer et al. _____ 219—373 |

FOREIGN PATENTS 693,197   6/1953   Great Britain.

ANTHONY BARTIS, *Primary Examiner.*

U.S. Cl. X.R.

228—20; 219—373, 227, 380, 238